April 16, 1929.  G. H. KEYES  1,709,435
VEHICLE WHEEL
Filed Oct. 11, 1927

Inventor,
George H. Keyes;
By A. B. Upham,
Attorney.

Patented Apr. 16, 1929.

1,709,435

UNITED STATES PATENT OFFICE.

GEORGE H. KEYES, OF BOSTON, MASSACHUSETTS, ASSIGNOR TO MARY L. HALL, OF BOSTON, MASSACHUSETTS.

VEHICLE WHEEL.

Application filed October 11, 1927. Serial No. 225,436.

The object if this invention is the construction of a simple and inexpensive wheel especially designed for automobiles and the like, which shall be resilient and easy-riding without the use of pneumatic tires.

In carrying out my invention, I provide means whereby the entire wheel rim is supported upon tautly stretched flexible elements.

Figure 1:
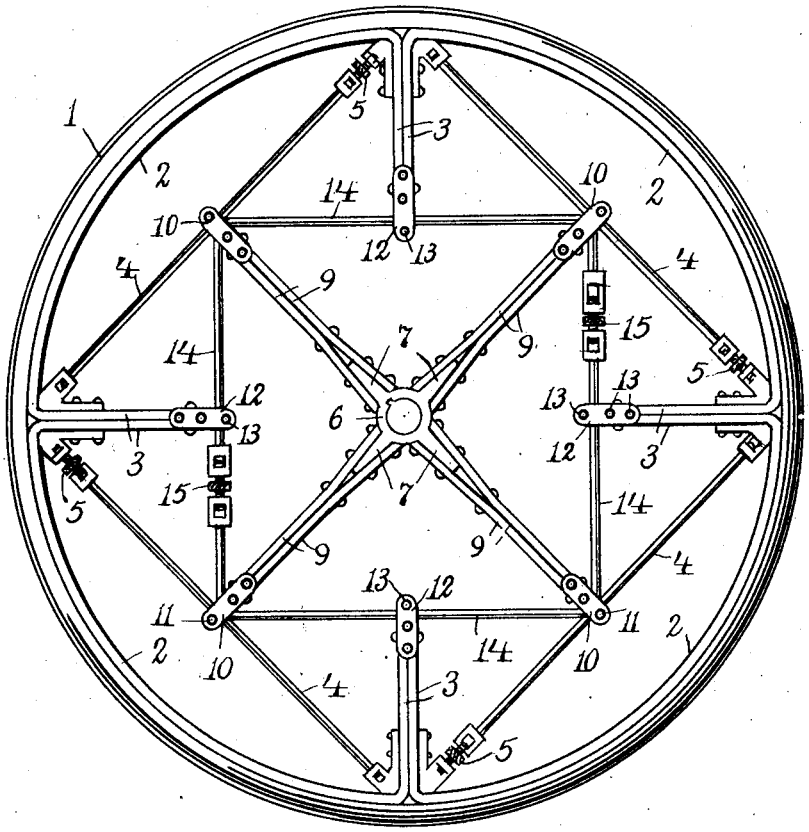
Figure 2:
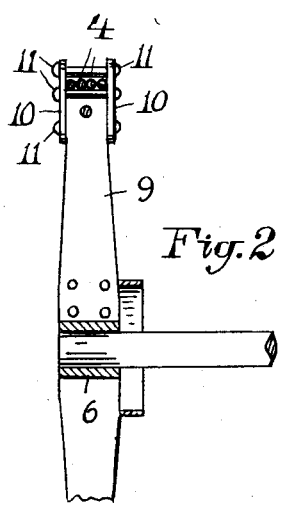
Figure 3:
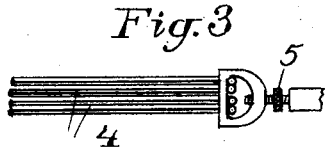

In the drawings forming part of this specification, Fig. 1 is a side view of a wheel embodying my invention. Fig. 2 is a sectional detail view of a part of the wheel. Fig. 3 is a detail view of one of the cable-anchoring devices.

The tread 1 of the wheel is preferably solid rubber; but the inner band is of steel or the like metal; the rim consisting of several segmental sections 2 having terminal portions 3 bent radially inward therefrom and each adjacent pair being suitably fastened together, as by bolts or rivets. Between the ends of the arcs 2 are stretched a plurality of cables 4, shown in Fig. 3 as four in number, but may be any number, from two up.

To ensure that these cables 4 shall be taut, a right-and-left hand adjusting screw 5 may be provided for each set. The hub 6 is preferably provided with a number of radial lugs 7, illustrated as four in order to equal the number of arcs 2; and to these lugs are attached bars 9, two for each projection. These bars or spokes 9 are made of a length to reach the chord-cables 4, and are loosely secured thereto by means of straps 10 and bolts or rivets 11, as shown in Fig. 2.

The ends of the elbows 3 are similarly provided with straps and rivets 12, 13 for the reception of cables 14 which are passed about the ends of the spokes 9; the elbows being proportioned to meet these cables when stretched taut. Adjusting screws 15 are also provided for the cables 14.

Thus constructed, the wheel-hub is resiliently suspended within the rim, and thus gives the ease of riding so much desired.

The cables likewise cushion the engine-power communicated thereto, thereby preventing the stripping of the gears, and the crystallization both of the wheels and of the machinery and springs.

Another advantage of my construction is that the pressure of the car upon the wheels tends to flatten the latter somewhat, by their resilient yielding, and so both to increase their spring action, and to increase the tread-area. The latter reduces the degree to which the wheels cut into the roadway, when the latter is soft, and also reduces the danger of skidding.

What I claim as my invention is:

1. A wheel comprising a plurality of rim-segments composed of metal each segment having an elbow bent radially inward, each pair of adjacent elbows being fastened together, a hub having an equal number of incomplete spokes projecting therefrom, and cables stretched from end to end of the spokes and engaging the ends of the elbows, and other cables stretched between the junctures of the elbows and their segments and connected with the ends of the spokes.

2. A wheel comprising a plurality of rim-segments composed of metal each having an elbow bent radially inward, each pair of adjacent elbows being fastened together, a hub having a plurality of spokes projecting therefrom, and cables stretched from end to end of the spokes and engaging the ends of the elbows, and other cables stretched between the junctures of the elbows and their segments and connected with the ends of the spokes.

3. A wheel as set forth in claim 1, wherein the spokes and elbows are secured to the cables by means of laterally disposed straps, and rivets penetrating them and enclosing the adjacent parts of the cables.

In testimony that I claim the foregoing invention, I have hereunto set my hand this 10th day of October, 1927.

GEORGE H. KEYES.